(12) United States Patent
Hsieh et al.

(10) Patent No.: US 12,399,858 B2
(45) Date of Patent: Aug. 26, 2025

(54) METHOD AND DEVICE FOR REDUCING LATENCY IN A PERIPHERAL COMPONENT INTERCONNECT EXPRESS LINK

(71) Applicant: MEDIATEK INC., Hsinchu (TW)

(72) Inventors: Yuan-Ming Hsieh, Hsinchu (TW); Wei-Cheng Chang, Hsinchu (TW); Hsin-Hao Huang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 122 days.

(21) Appl. No.: 18/527,468

(22) Filed: Dec. 4, 2023

(65) Prior Publication Data
US 2025/0181544 A1 Jun. 5, 2025

(51) Int. Cl.
*G06F 13/42* (2006.01)

(52) U.S. Cl.
CPC .. *G06F 13/4221* (2013.01); *G06F 2213/0026* (2013.01)

(58) Field of Classification Search
CPC ............. G06F 13/4221; G06F 2013/0023
USPC .............................................. 710/52
See application file for complete search history.

(56) References Cited

U.S. PATENT DOCUMENTS

| | | | | |
|---|---|---|---|---|
| 2016/0162421 A1* | 6/2016 | Xiong | ............... | G06F 13/20 |
| | | | | 710/52 |
| 2019/0138220 A1* | 5/2019 | Hahn | ............... | G06F 3/0611 |
| 2020/0358685 A1* | 11/2020 | Gupta | ............... | G06F 1/3206 |
| 2021/0067451 A1* | 3/2021 | Duenas | ............... | G06F 13/385 |
| 2021/0200298 A1* | 7/2021 | Branover | ............ | G06F 13/1668 |
| 2022/0200881 A1* | 6/2022 | Shusterman | ......... | H04W 24/08 |
| 2023/0118047 A1* | 4/2023 | Huang | ............... | G06F 11/2268 |
| | | | | 714/47.2 |
| 2024/0281049 A1* | 8/2024 | Aung | ............... | G06F 1/263 |

* cited by examiner

Primary Examiner — Christopher B Shin
(74) *Attorney, Agent, or Firm* — McClure, Qualey & Rodack, LLP

(57) ABSTRACT

A method for reducing latency in a peripheral component interconnect express (PCIe) link between a PCIe root complex and a PCIe device is provided. The method includes measuring, by the PCIe device, a throughput of data transmission that is sent to a buffer of the PCIe device. The method includes determining, by the PCIe device, a latency tolerance reporting (LTR) value based on the measured throughput. The method includes transmitting, by the PCIe device, the LTR value to the PCIe root complex at an estimated time point via the PCIe link, wherein the estimated time point is prior to a time at which a buffer switching operation occurs.

13 Claims, 4 Drawing Sheets

METHOD AND DEVICE FOR REDUCING LATENCY IN A PERIPHERAL COMPONENT INTERCONNECT EXPRESS LINK

BACKGROUND OF THE INVENTION

Field of the Invention

The present disclosure generally relates to power management in computer systems. More specifically, aspects of the present disclosure relate to techniques for reducing latency in a peripheral component interconnect express (PCIe) link between a PCIe root complex and a PCIe device.

Description of the Related Art

Many modern computer systems use a peripheral component interconnect express (PCIe) link to communicate between a PCIe root complex and a PCIe device. When a PCIe link is unused for a long period of time, the PCIe device may try to save power by putting the PCIe link into a power-saving mode. Typically, the more power that is saved by using the power-saving mode, the longer the amount of time it takes for the PCIe link to exit the power-saving mode and become operational again.

In a modem PCIe device, the memory type that buffers network data is selected according to the network conditions. External memory (for example, DRAM), which is larger and has longer latency, is selected when the modem PCIe device receives non-latency-awareness and low throughput of network data. External memory provides longer buffering time which allows the PCIe link to stay inactive in a power-saving mode for a longer time. Internal memory (for example, SRAM), which is smaller and has shorter latency, is selected when the modem PCIe device receives latency-awareness or high throughput of network data. Internal memory provides lower latency and a higher data processing rate of the modem PCIe device, whereas it makes the PCIe link wake up more frequently and consume more power.

The PCIe standard includes Latency Tolerance Reporting (LTR) as a mechanism for periodically notifying the PCIe root complex of the return time. The PCIe root complex may be able to make decisions about entering different power states, which have different wake-up times, based on the LTR value sent by the modem PCIe device.

In common designs, the LTR value is updated just before the network conditions change. For example, when the modem PCIe device detects that the throughput of network data has become higher, the modem PCIe device may switch its buffer from the internal memory to the external memory. At the same time, the modem PCIe device updates from a higher LTR value to a lower LTR value to prevent the buffer in the modem PCIe device from filling up.

However, since the LTR value is sent to the PCIe root complex after the buffer switching operation occurs, the PCIe root complex cannot update its configuration immediately, resulting in unexpected or unacceptable behavior and possibly a poor user experience.

Therefore, a method and a device for reducing latency in a peripheral component interconnect express (PCIe) link between a PCIe root complex and a PCIe device to improve upon the above shortcomings.

BRIEF SUMMARY OF THE INVENTION

The following summary is illustrative only and is not intended to be limiting in any way. That is, the following summary is provided to introduce concepts, highlights, benefits and advantages of the novel and non-obvious techniques described herein. Select, not all, implementations are described further in the detailed description below. Thus, the following summary is not intended to identify essential features of the claimed subject matter, nor is it intended for use in determining the scope of the claimed subject matter.

Therefore, the main purpose of the present disclosure is to provide a method and a device for reducing latency in a peripheral component interconnect express (PCIe) link between a PCIe root complex and a PCIe device to enable the PCIe root complex to enter the suitable power mode earlier.

In an exemplary embodiment, a method for reducing latency in a peripheral component interconnect express (PCIe) link between a PCIe root complex and a PCIe device is provided. The method comprises measuring, by the PCIe device, a throughput of data transmission that is sent to a buffer of the PCIe device. The method comprises determining, by the PCIe device, a latency tolerance reporting (LTR) value based on the measured throughput. The method comprises transmitting, by the PCIe device, the LTR value to the PCIe root complex at an estimated time point via the PCIe link, wherein the estimated time point is prior to a time at which a buffer switching operation occurs.

In some embodiments, the estimated time point is determined based on the measured throughput.

In some embodiments, the estimated time point is one millisecond or 500 microseconds before the time when the buffer switching operation occurs.

In some embodiments, the PCIe device is connected to the PCIe root complex using a Peripheral Component Interconnect Express (PCIe) bus.

In an exemplary embodiment, a device for reducing latency in a peripheral component interconnect express (PCIe) link is provided. The device comprises one or more processors; and one or more computer storage media for storing one or more computer-readable instructions. The processor is configured to drive the computer storage media to execute the following tasks. The processor measures a throughput of data transmission that is sent to a buffer of the device. The processor determines a latency tolerance reporting (LTR) value based on the measured throughput. The processor transmits the LTR value to a PCIe root complex at an estimated time point via the PCIe link, wherein the estimated time point is prior to a time at which a buffer switching operation occurs.

In an exemplary embodiment, a non-transitory computer-readable storage medium storing instructions that, when executed by a processor in a PCIe device, cause the device to perform a method for reducing latency in a peripheral component interconnect express (PCIe) link between a PCIe root complex and the PCIe device is provided. The method comprises measuring a throughput of data transmission that is sent to a buffer of the PCIe device. The method comprises determining a latency tolerance reporting (LTR) value based on the measured throughput. The method comprises transmitting the LTR value to the PCIe root complex at an estimated time point via the PCIe link, wherein the estimated time point is prior to a time at which a buffer switching operation occurs.

BRIEF DESCRIPTION OF THE DRAWINGS

The accompanying drawings are included to provide a further understanding of the present disclosure, and are incorporated in and constitute a part of the present disclosure. The drawings illustrate implementations of the disclosure and, together with the description, serve to explain the principles of the disclosure. It should be appreciated that the drawings are not necessarily to scale as some components may be shown out of proportion to their size in actual implementation in order to clearly illustrate the concept of the present disclosure.

DETAILED DESCRIPTION OF THE INVENTION

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using number of the aspects set forth herein. In addition, the scope of the disclosure is intended to cover such an apparatus or method which is practiced using another structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects. Furthermore, like numerals refer to like elements throughout the several views, and the articles "a" and "the" includes plural references, unless otherwise specified in the description.

It should be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion. (e.g., "between" versus "directly between", "adjacent" versus "directly adjacent", etc.).

The described embodiments perform operations for reducing latency in a peripheral component interconnect express (PCIe) link between a PCIe root complex and a PCIe device. In the described embodiments, the PCIe link between the PCIe root complex and the PCIe device may conform to the PCI special interest group (PIC-SIG) PCIe specification (e.g., PCI Express 3.0 Base specification revision 3.0).

Figure 1:
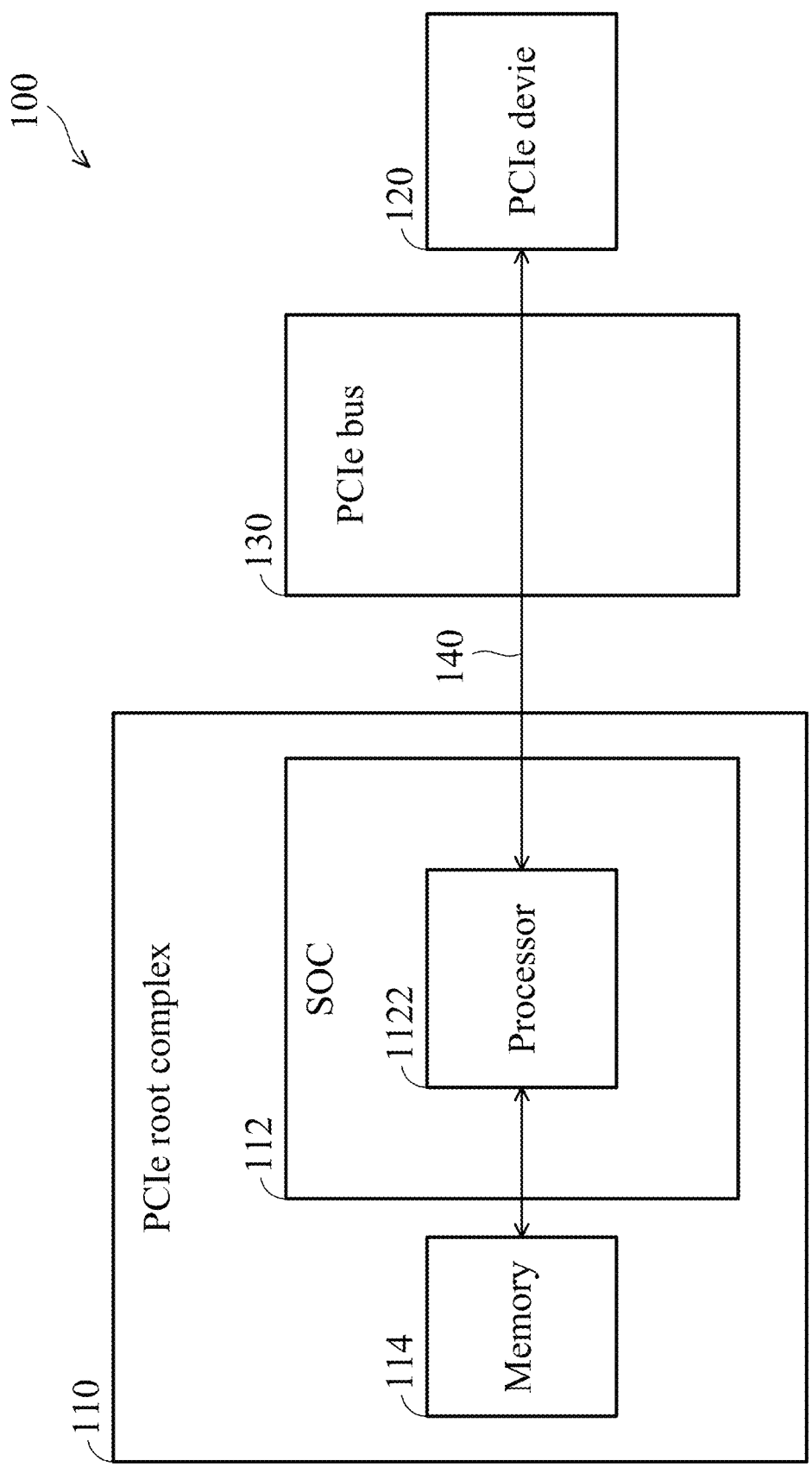
FIG. 1 is a block diagram illustrating an example link environment operable to reduce latency according to an embodiment of the disclosure.

FIG. 1 is a block diagram illustrating an example link environment 100 operable to reduce latency according to an embodiment of the disclosure. The link environment 100 at least comprises a peripheral component interconnect express (PCIe) root complex 110 and a PCIe device 120, wherein the PCIe root complex 110 and the PCIe device 120 are connected by a PCIe bus 130.

The PCIe root complex 110 can be (or can be included in) any device that communicates with the PCIe device 120 over the PCIe bus 130. For example, the PCIe root complex 110 can be (or can be included in) a laptop computer, desktop computer, a server, an appliance, a subnotebook/netbook, a tablet computer, a cellular phone, a personal digital assistant (PDA), a smartphone, or another device. Note that the PCIe root complex 110 can include other subsystems (not shown) including but not limited to communications subsystems, display subsystems, data collection subsystems, audio and/or video subsystems, alarm subsystems, media processing subsystems, input/output (I/O) subsystems, and/or one or more other processing subsystems (e.g., CPUs), or power subsystems (e.g., battery, battery management unit, and/or other power management subsystems).

The PCIe device 120 is any device that can communicate with the PCIe root complex 110 over the PCIe bus 130. The PCIe device 120 may be or may include one or more devices or systems (e.g., peripherals) that perform functionalities including, for example, wireless communications, storage, and/or graphics processing. Note that in some embodiments, the PCIe device 120 may be located inside the PCIe root complex 110, while in some embodiments the PCIe device 120 may be located externally to the PCIe root complex 110. The PCIe device 120 will be discussed in more detail below with respect to FIG. 2.

A link 140 between the PCIe root complex 110 and the PCIe device 120 is a PCIe link that allows communication between the PCIe root complex 110 and the PCIe device 120 using a PCIe specification such as PCIe base specification 3.0 by PCI-SIG.

The PCIe root complex 110 may at least comprise a system on a chip (SOC) 112 and a memory 114. The SOC 112 at least comprises a processor 1122 and may comprise other subsystems (not shown) such as memory, counters, clocks, interface regulators, power management circuits, and/or analog and/or digital interfaces. Additionally, note that in some embodiments, more than one PCIe link 140 may be connected to the processor 1122.

The processor 1122 comprises one or more devices configured to perform computational operations. For example, the processor 1122 may comprise one or more microprocessors each with one or more cores, application-specific integrated circuits (ASICs), microcontrollers, and/or programmable-logic devices. In some embodiments, some or all of the functionality of the SOC 112 may be replaced by one or more circuits that may include one or more microprocessors and/or multicore processing systems.

The memory 114 comprises one or more devices for storing data and/or instructions for subsystems in the PCIe root complex 110 including those on the SOC 112 such as the processor 1122. The memory 114 may comprise dynamic random access memory (DRAM), static random access memory (SRAM), and/or other types of memory, and may comprise mechanisms for controlling access to the memory. In some embodiments, the memory 114 comprises a memory hierarchy that comprises one or more caches coupled to a memory (not shown) in the SOC 112. In some embodiments, the memory 114 is coupled to one or more high-capacity mass-storage devices (not shown). For example, the memory 114 may be coupled to a magnetic or optical drive, a solid-state drive, or another type of mass-storage device. In these embodiments, the memory 114 may be used by the PCIe root complex 110 as fast-access storage for often-used data, while the mass-storage device is used to store less frequently used data.

Furthermore, in this context, the PCIe device 120 may be an endpoint as those terms are used in the PCIe standard.

Figure 2:
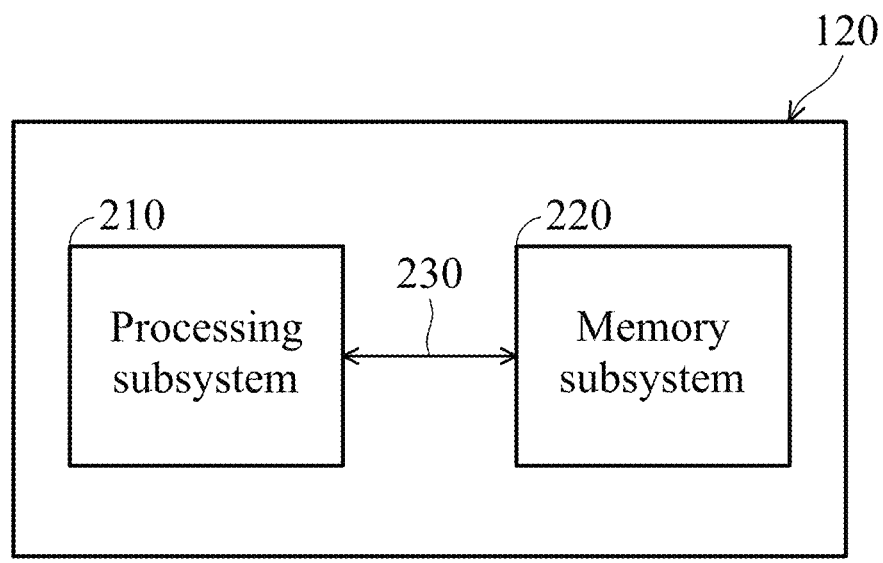
FIG. 2 presents a block diagram illustrating the PCIe device in according to an embodiment of the present disclosure.

FIG. 2 presents a block diagram illustrating the PCIe device 120 in according to an embodiment of the present disclosure. The PCIe device 120 comprises a processing subsystem 210 and a memory subsystem 220 coupled to a bus 230. The PCIe device 120 may comprise other subsystems (not shown) such as subsystems for wireless communications, mass storage, and/or graphics processing, in addition to subsystems (not shown) for coupling to and communicating over a PCIe bus 130.

The processing subsystem 210 is any processing subsystem configured to perform computational and/or logic operations that may be used in a PCIe device, and may be implemented in any technology, including but not limited to any type of hardware module, software, firmware, and/or any other general purpose or special purpose logic. The processing subsystem 210 may comprise but is not limited to one or more central processing units (CPUs), microprocessors, application-specific integrated circuit (ASIC) chips, field-programmable gate arrays (FPGAs), other programmable-logic devices, dedicated logic devices, and microcontrollers.

The memory subsystem 220 comprises one or more devices for storing data and/or instructions for the processing subsystem 210 and other subsystems (not shown) in the PCIe device 120. For example, the memory subsystem 220 may comprise a dynamic random access memory (DRAM), a static random access memory (SRAM), a read-only memory (ROM), an erasable programmable read-only memory (EPROM), a flash memory, and/or other types of memory. In addition, the memory subsystem 220 may comprise firmware and mechanisms for controlling access to a buffer, a memory or other subsystems (not shown) in the PCIe device 120.

The processing subsystem 210 and the memory subsystem 220 are coupled together using the bus 230. The bus 230 is an electrical, optical, or electro-optical connection that these subsystems and, in some embodiments, other subsystems (not shown) in the PCIe device 120 may use to communicate commands and data among one another. Although only one bus 230 is shown for clarity, different embodiments may comprise a different number or configuration of electrical or other connections among the subsystems.

Although the processing subsystem 210 and the memory subsystem 220 are shown as separate subsystems in FIG. 2, in some embodiments, one or both of these subsystems can be integrated into one or more other subsystems in the PCIe device 120. Furthermore, in some embodiments, the PCIe device 120 may comprise one or more additional processing subsystems 210 and/or memory subsystems 220, and although we use specific subsystems to describe the PCIe device 120, in alternative embodiments, different subsystems may be present in the PCIe device 120. Additionally, although the processing subsystem 210 and the memory subsystem 220 are depicted as separate subsystems in FIG. 2, in some embodiments these and other subsystems (not shown) in the PCIe device 120 may be implemented on one integrated circuit.

Figure 3:
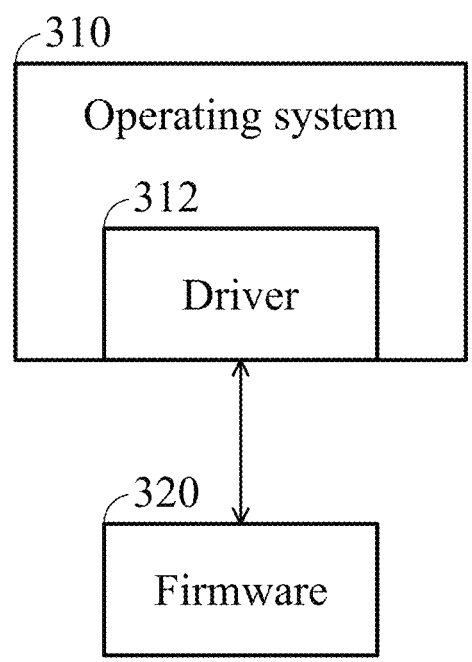
FIG. 3 presents a block diagram illustrating an operating system with a driver operating on the PCIe root complex coupled over a PCIe link to the firmware operating on the PCIe device in accordance with the described embodiments.

FIG. 3 presents a block diagram illustrating an operating system 310 with a driver 312 operating on the PCIe root complex 110 coupled over a PCIe link to the firmware 320 operating on the PCIe device 120 in accordance with the described embodiments.

In some embodiments, the operating system 310 is stored (as program codes) in the memory 114 and executed by the processor 1122. Generally, the operating system 310 serves as an intermediary between a system hardware in the PCIe root complex 110 and applications executed by the processor 1122, which can be, for example, an email application, a web browser, and a game application. The operating system 310 also comprises a driver 312 which enables the operating system 310 and other applications operating on the processor 1122 to communicate with the PCIe device 120. The operating system 310 and its general functions are known in the art and hence are not described in detail.

The PCIe device 120 comprises a firmware 320 which may be preloaded on the PCIe device 120 and/or dynamically loaded by the driver 312, and generally includes data and/or programming used to operate and control the PCIe device 120. The firmware 320 may be stored in the memory subsystem 220 in a read-only memory (ROM), a programmable read-only memory (PROM), and/or an erasable programmable read-only memory (EPROM), and executed on the processing subsystem 210. In some embodiments, the firmware 320 may be partially or completely replaced by software stored in the memory subsystem 220 and operating on the processing subsystem 202, and/or one or more hardware modules (not shown) in the PCIe device 120.

Figure 5:
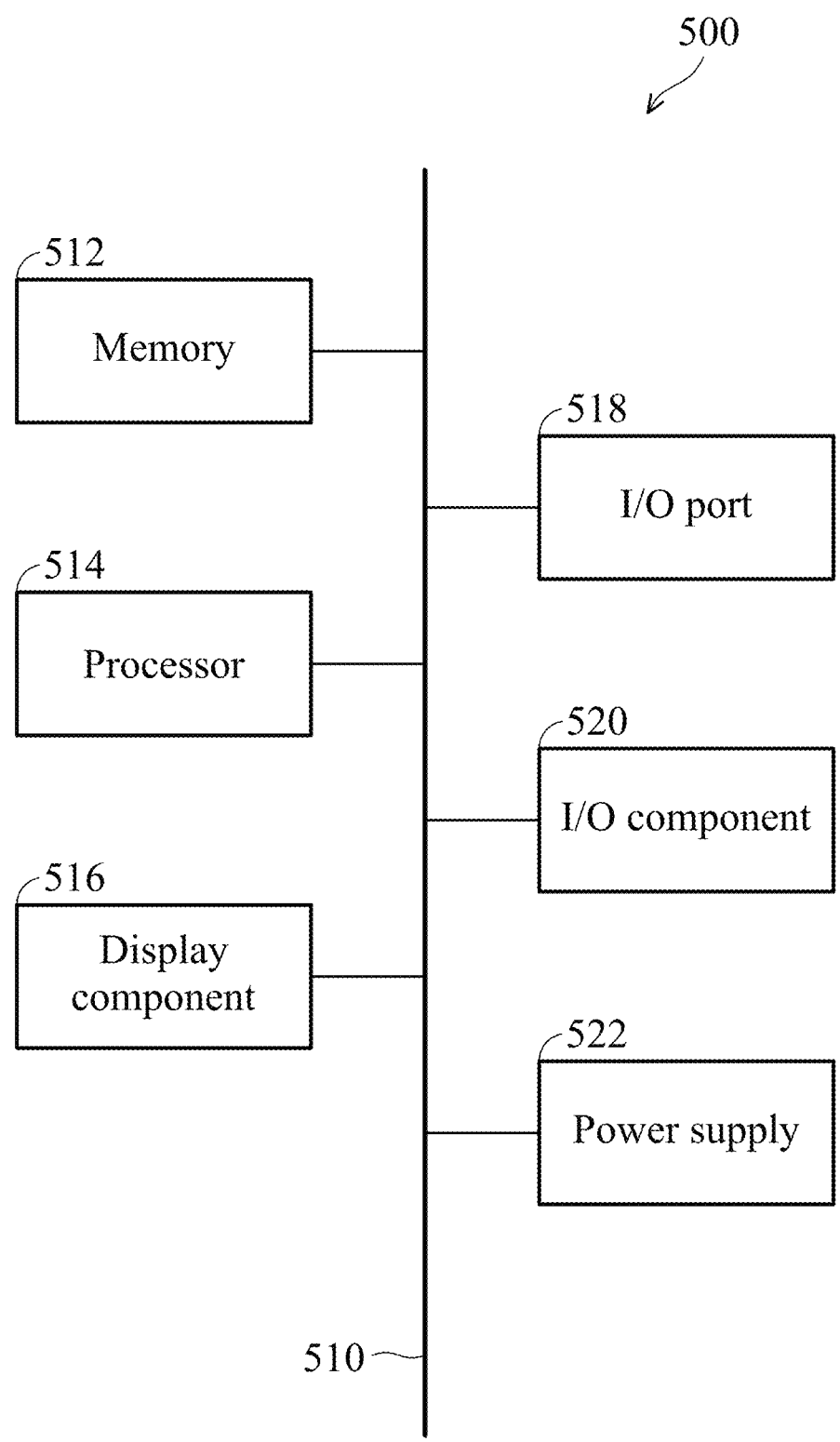
FIG. 5 illustrates an exemplary operating environment for implementing embodiments of the present disclosure.

It should be understood that the PCIe root complex 110 and the PCIe device 120 shown in FIG. 1 is an example of one suitable link environment 100. The PCIe root complex 110 and the PCIe device 120 shown in FIG. 1 can be implemented via any type of computing device, such as the computing device 500 described with reference to FIG. 5, as shown in FIG. 5.

Figure 4:
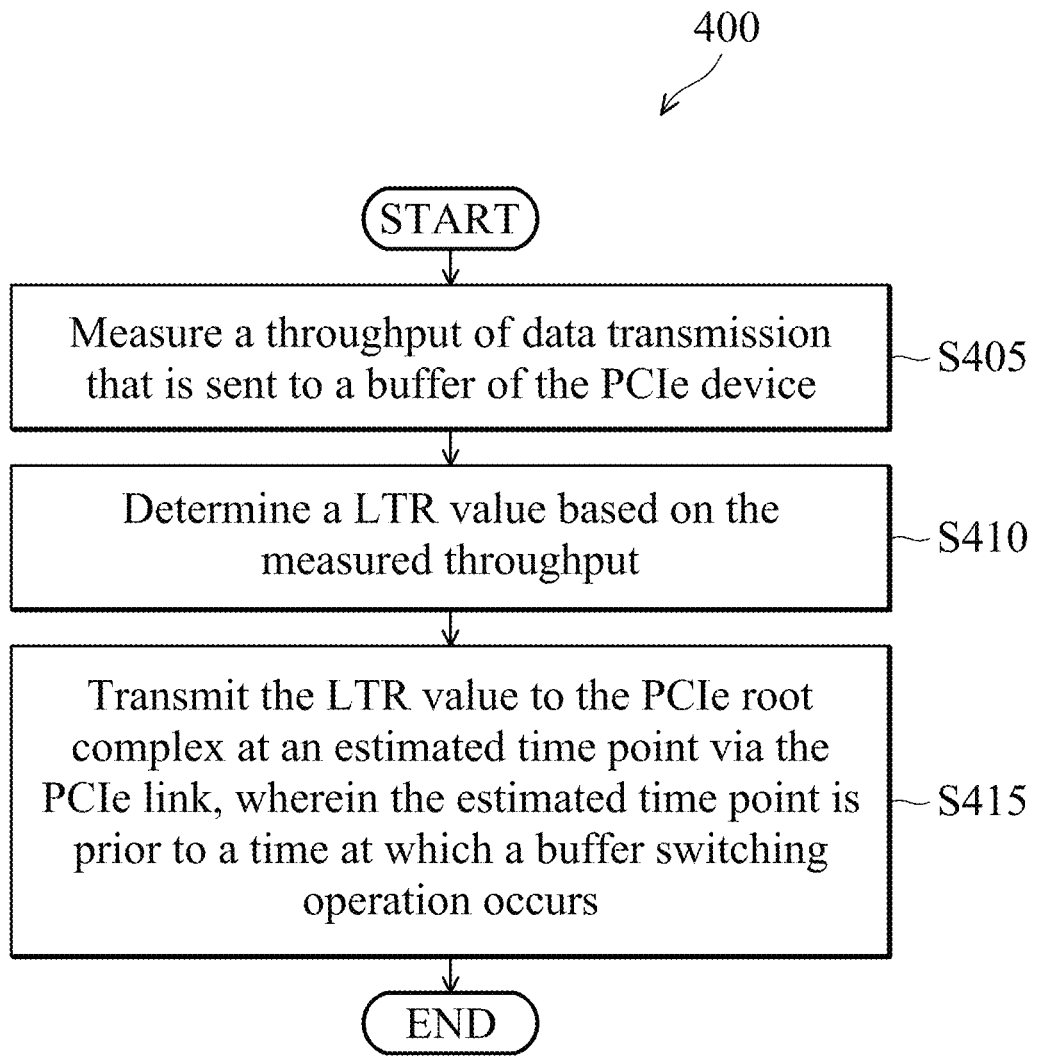
FIG. 4 is a flow chart illustrating a method for reducing latency in a peripheral component interconnect express (PCIe) link according to an embodiment of the disclosure.

FIG. 4 is a flow chart 400 illustrating a method for reducing latency in a peripheral component interconnect express (PCIe) link according to an embodiment of the disclosure. In this embodiment, the method is applied to the processing subsystem 210 of the PCIe device 120 in FIG. 2.

In step S405, the PCIe device measures a throughput of data transmission that is sent to a buffer of the PCIe device.

Then, in step S410, the PCIe device determines a latency tolerance reporting (LTR) value based on the measured throughput.

In step S415, the PCIe device transmitting the LTR value to the PCIe root complex at an estimated time point via the PCIe link, wherein the estimated time point is prior to a time at which a buffer switching operation occurs.

Specifically, after the PCIe device measure the throughput of the current data transmission that is sent to the buffer of the PCIe device, the PCIe device may determine the LTR value and dynamically adjust the estimated time point according to the throughput of the current data transmission. For example, in case of low throughput, the PCIe device increases the LTR value and delays the estimated time point to transmit the LTR value. In the case of high throughput, the PCIe device reduces the LTR value and updates the estimated time point to an earlier time when the PCIe device transmits the LTR value.

In some embodiments, the estimated time point is one millisecond or 500 microseconds before the time when the buffer switching operation occurs and can be adjusted based on experimental results.

In another embodiment, the PCIe root complex may select a suitable power state that comply with the LTR value from a plurality of power states after receiving the LTR value, and then receives the data transmitted from the PCIe device.

As mentioned above, the method and device for reducing latency in a peripheral component interconnect express (PCIe) link in the disclosure may dynamically adjust the LTR value and the estimated time point when the LTR value is transmitted according to different cases of throughput of data transmission. Since the LTR value is transmitted before the buffer switching operation occurs, the PCIe root complex can switch the power states in advance according to the LTR value and receive the data transmitted from the PCIe device faster.

Having described embodiments of the present disclosure, an exemplary operating environment in which embodiments of the present disclosure may be implemented is described below. Referring to FIG. 5, an exemplary operating environment for implementing embodiments of the present disclosure is shown and generally known as a computing device 500. The computing device 500 is merely an example of a suitable computing environment and is not intended to limit the scope of use or functionality of the disclosure. Neither should the computing device 500 be interpreted as having any dependency or requirement relating to any one or combination of components illustrated.

The disclosure may be realized by means of the computer code or machine-useable instructions, including computer-executable instructions such as program modules, being executed by a computer or other machine, such as a personal data assistant (PDA) or other handheld device. Generally, program modules may include routines, programs, objects, components, data structures, etc., and refer to code that performs particular tasks or implements particular abstract data types. The disclosure may be implemented in a variety of system configurations, including hand-held devices, consumer electronics, general-purpose computers, more specialty computing devices, etc. The disclosure may also be implemented in distributed computing environments where tasks are performed by remote-processing devices that are linked by a communication network.

With reference to FIG. 5, the computing device 500 may include a bus 510 that is directly or indirectly coupled to the following devices: one or more memories 512, one or more processors 514, one or more display components 516, one or more input/output (I/O) ports 518, one or more input/output components 520, and an illustrative power supply 522. The bus 510 may represent one or more kinds of busses (such as an address bus, data bus, or any combination thereof). Although the various blocks of FIG. 5 are shown with lines for the sake of clarity, and in reality, the boundaries of the various components are not specific. For example, the display component such as a display device may be considered an I/O component and the processor may include a memory.

The computing device 500 typically includes a variety of computer-readable media. The computer-readable media can be any available media that can be accessed by computing device 500 and includes both volatile and nonvolatile media, removable and non-removable media. By way of example, not limitation, computer-readable media may comprise computer storage media and communication media. The computer storage media may include volatile and non-volatile, removable and non-removable media implemented in any method or technology for storage of information such as computer-readable instructions, data structures, program modules or other data. The computer storage media may include, but not limit to, random access memory (RAM), read-only memory (ROM), electrically-erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by the computing device 500. The computer storage media may not comprise signals per se.

The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, but not limitation, communication media includes wired media such as a wired network or direct-wired connection, and wireless media such as acoustic, RF, infrared and other wireless media or any combination thereof.

The memory 512 may include computer-storage media in the form of volatile and/or nonvolatile memory. The memory may be removable, non-removable, or a combination thereof. Exemplary hardware devices include solid-state memory, hard drives, optical-disc drives, etc. The computing device 500 includes one or more processors that read data from various entities such as the memory 512 or the I/O components 520. The display component(s) 516 present data indications to a user or to another device. Exemplary presentation components include a display device, speaker, printing component, vibrating component, etc.

The I/O ports 518 allow the computing device 500 to be logically coupled to other devices including the I/O components 520, some of which may be embedded. Illustrative components include a microphone, joystick, game pad, satellite dish, scanner, printer, wireless device, etc. The I/O components 520 may provide a natural user interface (NUI) that processes gestures, voice, or other physiological inputs generated by a user. For example, inputs may be transmitted to an appropriate network element for further processing. A NUI may be implemented to realize speech recognition, touch and stylus recognition, facial recognition, biometric recognition, gesture recognition both on screen and adjacent to the screen, air gestures, head and eye tracking, touch recognition associated with displays on the computing device 500, or any combination thereof. The computing device 600 may be equipped with depth cameras, such as stereoscopic camera systems, infrared camera systems, RGB camera systems, or any combination thereof, to realize gesture detection and recognition. Furthermore, the computing device 500 may be equipped with accelerometers or gyroscopes that enable detection of motion. The output of the accelerometers or gyroscopes may be provided to the display of the computing device 500 to carry out immersive augmented reality or virtual reality.

Furthermore, the processor 514 in the computing device 500 can execute the program code in the memory 512 to perform the above-described actions and steps or other descriptions herein.

It should be understood that any specific order or hierarchy of steps in any disclosed process is an example of a sample approach. Based upon design preferences, it should be understood that the specific order or hierarchy of steps in the processes may be rearranged while remaining within the scope of the present disclosure. The accompanying method claims present elements of the various steps in a sample order, and are not meant to be limited to the specific order or hierarchy presented.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for reducing latency in a peripheral component interconnect express (PCIe) link between a PCIe root complex and a PCIe device, comprising:
   measuring, by the PCIe device, a throughput of data transmission that is sent to a buffer of the PCIe device;
   determining, by the PCIe device, a latency tolerance reporting (LTR) value based on the measured throughput; and
   transmitting, by the PCIe device, the LTR value to the PCIe root complex at an estimated time point via the PCIe link, wherein the estimated time point is prior to a time at which a buffer switching operation occurs.

2. The method for reducing latency in a peripheral component interconnect express (PCIe) link as claimed in claim 1, wherein the estimated time point is determined based on the measured throughput.

3. The method for reducing latency in a peripheral component interconnect express (PCIe) link as claimed in claim 1, wherein the estimated time point is one millisecond or 500 microseconds before the time when the buffer switching operation occurs.

4. The method for reducing latency in a peripheral component interconnect express (PCIe) link as claimed in claim 1, wherein the PCIe device is connected to the PCIe root complex using a Peripheral Component Interconnect Express (PCIe) bus.

5. A device for reducing latency in a peripheral component interconnect express (PCIe) link, comprising:
   one or more processors; and
   one or more computer storage media for storing one or more computer-readable instructions, wherein the processor is configured to drive the computer storage media to execute the following tasks:
   measuring a throughput of data transmission that is sent to a buffer of the device;
   determining a latency tolerance reporting (LTR) value based on the measured throughput; and
   transmitting the LTR value to a PCIe root complex at an estimated time point via the PCIe link, wherein the estimated time point is prior to a time at which a buffer switching operation occurs.

6. The device for reducing latency in a peripheral component interconnect express (PCIe) link as claimed in claim 5, wherein the estimated time point is determined based on the measured throughput.

7. The device for reducing latency in a peripheral component interconnect express (PCIe) link as claimed in claim 5, wherein the estimated time point is one millisecond or 500 microseconds before the time when the buffer switching operation occurs.

8. The device for reducing latency in a peripheral component interconnect express (PCIe) link as claimed in claim 5, wherein the PCIe device is connected to the PCIe root complex using a Peripheral Component Interconnect Express (PCIe) bus.

9. The device for reducing latency in a peripheral component interconnect express (PCIe) link as claimed in claim 5, wherein the device is a PCIe device.

10. A non-transitory computer-readable storage medium storing instructions that, when executed by a processor in a PCIe device, cause the device to perform a method for reducing latency in a peripheral component interconnect express (PCIe) link between a PCIe root complex and the PCIe device, the method comprising:
    measuring a throughput of data transmission that is sent to a buffer of the PCIe device;
    determining a latency tolerance reporting (LTR) value based on the measured throughput; and
    transmitting the LTR value to the PCIe root complex at an estimated time point via the PCIe link, wherein the estimated time point is prior to a time at which a buffer switching operation occurs.

11. The non-transitory computer-readable storage medium as claimed in claim 10, wherein the estimated time point is determined based on the measured throughput.

12. The non-transitory computer-readable storage medium as claimed in claim 10, wherein the estimated time point is one millisecond or 500 microseconds before the time when the buffer switching operation occurs.

13. The non-transitory computer-readable storage medium as claimed in claim 10, wherein the PCIe device is connected to the PCIe root complex using a Peripheral Component Interconnect Express (PCIe) bus.

* * * * *